(12) United States Patent
Marianetti, II et al.

(10) Patent No.: US 6,188,789 B1
(45) Date of Patent: *Feb. 13, 2001

(54) METHOD AND APPARATUS OF IMMEDIATE RESPONSE HANDWRITING RECOGNITION SYSTEM THAT HANDLES MULTIPLE CHARACTER SETS

(75) Inventors: Ronald Marianetti, II, Morgan Hill; Robert Yuji Haitani, Cupertino, both of CA (US)

(73) Assignee: Palm, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 09/225,200

(22) Filed: Jan. 5, 1999

Related U.S. Application Data

(63) Continuation of application No. 08/760,709, filed on Dec. 5, 1996, now Pat. No. 5,889,888.

(51) Int. Cl.[7] ........................................ G06K 9/00
(52) U.S. Cl. ............................... 382/189; 382/185
(58) Field of Search ........................ 382/181, 185–189, 382/309–311; 345/156, 179; 178/18.01, 18.03

(56) References Cited

U.S. PATENT DOCUMENTS

| | | | |
|---|---|---|---|
| 4,531,231 | 7/1985 | Crane et al. | 382/13 |
| 5,150,424 | 9/1992 | Aguro et al. | 382/13 |
| 5,191,622 | 3/1993 | Shojima et al. | 382/13 |
| 5,267,327 | 11/1993 | Hirayama | 382/13 |
| 5,732,152 | 3/1998 | Sakai et al. | 382/189 |
| 5,781,663 | 7/1998 | Sakaguchi et al. | 382/189 |
| 5,838,820 | 11/1998 | Bergman | 382/187 |
| 5,881,169 | * 3/1999 | Henry, Jr. | 382/187 |
| 5,889,888 | * 3/1999 | Marianetti, II et al. | 382/187 |

* cited by examiner

*Primary Examiner*—Bhavesh Mehta
(74) *Attorney, Agent, or Firm*—Van Mahamedi; Wilson Sonsini Goodrich & Rosati

(57) ABSTRACT

To efficiently recognize characters from several character sets, a palmtop computer system is disclosed wherein more that one character input area is displayed. Each character input area is designed to recognize strokes that represent characters from a different character set. In one embodiment, the palmtop computer system has an alphabetic input area and a numeral input area. In such an embodiment, strokes entered in the alphabetic input area are interpreted as alphabetic characters and strokes entered in the numeral input area are interpreted as numerals.

15 Claims, 7 Drawing Sheets

| Letter | Stroke |
|---|---|
| A | ∧ |
| B | BB3 |
| C | C |
| D | bD |
| E | Ɛ |
| F | ГГ |
| G | C6 |
| H | h |
| I | l |
| J | J |
| K | ⊀ |
| L | L |
| M | ᶭᶭ |

| Letter | Stroke |
|---|---|
| N | N |
| O | OO |
| P | PP |
| Q | O |
| R | RR |
| S | S |
| T | ⌐ |
| U | U |
| V | VV |
| W | W |
| X | X⊁ |
| Y | Ψ Y |
| Z | Z |

Figure 1

| Number | Stroke |
|---|---|
| 0 | OO |
| 1 | l |
| 2 | 2 |
| 3 | 3 |
| 4 | L⌐ |

| Number | Stroke |
|---|---|
| 5 | 5bS |
| 6 | 6 |
| 7 | ⌐ |
| 8 | 88 |
| 9 | 9 |

Figure 2

| | | | | | | | | | |
|---|---|---|---|---|---|---|---|---|---|
| あ | a | い | i | う | u | え | e | お | o |
| か | ka | き | ki | く | ku | け | ke | こ | ko |
| が | ga | ぎ | gi | ぐ | gu | げ | ge | ご | go |
| さ | sa | し | si (shi) | す | su | せ | se | そ | so |
| ざ | za | じ | zi (ji) | ず | zu | ぜ | ze | ぞ | zo |
| た | ta | ち | ti (chi) | つ | tu (tsu) | て | te | と | to |
| だ | da | ぢ | di | づ | du | で | de | ど | do |
| な | na | に | ni | ぬ | nu | ね | ne | の | no |
| は | ha | ひ | hi | ふ | hu (fu) | へ | he | ほ | ho |
| ば | ba | び | bi | ぶ | bu | べ | be | ぼ | bo |
| ぱ | pa | ぴ | pi | ぷ | pu | ぺ | pe | ぽ | po |
| ま | ma | み | mi | む | mu | め | me | も | mo |
| や | ya | | | ゆ | yu | | | よ | yo |
| ら | ra | り | ri | る | ru | れ | re | ろ | ro |
| わ | wa | ゐ | wi | | | ゑ | we | を | wo |
| ん | n (nn) | | | | | | | | |

Figure 6a

| | | | | | | |
|---|---|---|---|---|---|---|
| きゃ | kya | きゅ | kyu | きょ | kyo |
| ぎゃ | gya | ぎゅ | gyu | ぎょ | gyo |
| しゃ | sya (sha) | しゅ | syu (shu) | しょ | syo (sho) |
| じゃ | zya (ja) | じゅ | zyu (ju) | じょ | zyo (jo) |
| ちゃ | tya (cha) | ちゅ | tyu (chu) | ちょ | tyo (cho) |
| ぢゃ | dya | ぢゅ | dyu | ぢょ | dyo |
| にゃ | nya | にゅ | nyu | にょ | nyo |
| ひゃ | hya | ひゅ | hyu | ひょ | hyo |
| びゃ | bya | びゅ | byu | びょ | byo |
| ぴゃ | pya | ぴゅ | pyu | ぴょ | pyo |
| みゃ | mya | みゅ | myu | みょ | myo |
| りゃ | rya | りゅ | ryu | りょ | ryo |

Figure 6b

METHOD AND APPARATUS OF IMMEDIATE RESPONSE HANDWRITING RECOGNITION SYSTEM THAT HANDLES MULTIPLE CHARACTER SETS

CROSS REFERENCE TO RELATED APPLICATION

This application is a continuation of Application No. 08/760,709, filed Dec. 5, 1996, now U.S. Pat. No. 5,889,888, by inventors Ronald Marianetti II and Robert Y. Haitani, entitled "Method And Apparatus For Immediate Response Handwriting Recognition System That Handles Multiple Character Sets".

FIELD OF THE INVENTION

The present invention relates to the field of palmtop computers and handwriting recognition systems. Specifically, the present invention discloses a handwriting input system that reduces the number of strokes to recognize a wide variety of different characters.

BACKGROUND OF THE INVENTION

As the components required to build a computer system have reduced in size, new categories of computer systems have emerged. One of the new categories of computer systems is the "palmtop" computer system. A palmtop computer system is a computer that is small enough to be held in the hand of a user. Most palmtop computer systems are used to implement various Personal Information Management (PIM) applications such as an address book, a daily organizer, and electronic notepads.

Since palmtop computer systems are very small, keyboards are generally not efficient input devices. Palmtop computers with keyboards have keyboards that are so small that a user cannot touch-type. Furthermore, to use a keyboard a user must either place the palmtop computer system down onto a flat surface so the user can type with both hands or hold the palmtop computer system with two hands and type with thumbs only.

Instead of using a keyboard, many palm top computers employ a pen and a digitizer pad as an input system. The pen and digitizer pad combination works well for palmtop computers since the arrangement allows a user to hold the palmtop computer system in one hand while writing with the pen onto the digitizer pad with the other hand.

A number of palmtop computer systems that rely on the pen and digitizer pad combination as t he primary means of input have been introduced to the market. Most of these pen-based palmtop computer systems provide some type of handwriting recognition system whereby the user can write words and letters on the digitizer pad with a stylus. The palmtop computer system then converts the user's handwriting into a machine readable format such as ASCII code. Examples of pen-based palmtop computer systems that provide handwriting recognition include the Apple® Newton® and the Tandy® Zoomer™.

Consumer acceptance of pen based palmtop computer systems has been limited due to the poor performance of handwriting recognition systems. When a human reads a handwritten message, the human uses various clues to decipher the handwriting such as the known spelling of words, the known subject of the message, the writer's character writing style, and knowledge of English grammar. Since it is very difficult to teach a computer system all these subtle handwriting recognition heuristics, most handwriting recognition systems only rely on the writer's input strokes and a dictionary of common words. Using such limited information, such handwriting recognition systems often yield inaccurate results.

One method of simplifying the task of handwriting recognition is to divide the recognition task into identifying individual characters. This method is employed by the recognition system disclosed in the patent application titled "Multiple Pen Stroke Character Set and Handwriting Recognition System With Immediate Response" filed by Hawkins, et al. on Jul. 1, 1994, having U.S. Ser. No. 08/270,025. Using the immediate character recognition system disclosed in the Hawkins reference, a user can write as fast he wants and achieve nearly 100% recognition. However, systems constructed according to the Hawkins reference can only recognize a limited number of characters with out introducing confusing "mode change" strokes. It would therefore be desirable to have a computer system with a character recognition system that can recognize a large number of different characters with less effort on the user's part (i.e., fewer "mode change" strokes).

SUMMARY AND OBJECTS OF THE INVENTION

It is therefore an object of the present invention to design a recognition system that can extend the number of different characters without adding mode change strokes. This an other objectives are achieved by the multiple character set handwriting recognition system of the present invention.

To efficiently recognize characters from several character sets, a palmtop computer system is disclosed wherein more than one character input area is displayed. Each character input area is designed to recognize strokes that represent characters from a different character set. In one embodiment, the palmtop computer system has an alphabetic input area and a numeral input area. In such an embodiment, strokes entered in the alphabetic input area are interpreted as alphabetic characters and strokes entered in the numeral input area are interpreted as numerals.

BRIEF DESCRIPTION OF THE DRAWINGS

The objects, features, and advantages of the present invention will be apparent from the following detailed description of the preferred embodiment of the invention with references to the following drawings.

FIG. 1 illustrates the pen strokes used to represent the twenty-six letters of the ordinary English Alphabet.

FIG. 2 illustrates the pen strokes used to represent the ten Arabic digits used in the English language.

FIGS. 6a and 6b illustrate a romanized input system that accepts roman characters to input Japanese Hiragana.

DETAILED DESCRIPTION

Figure 3:
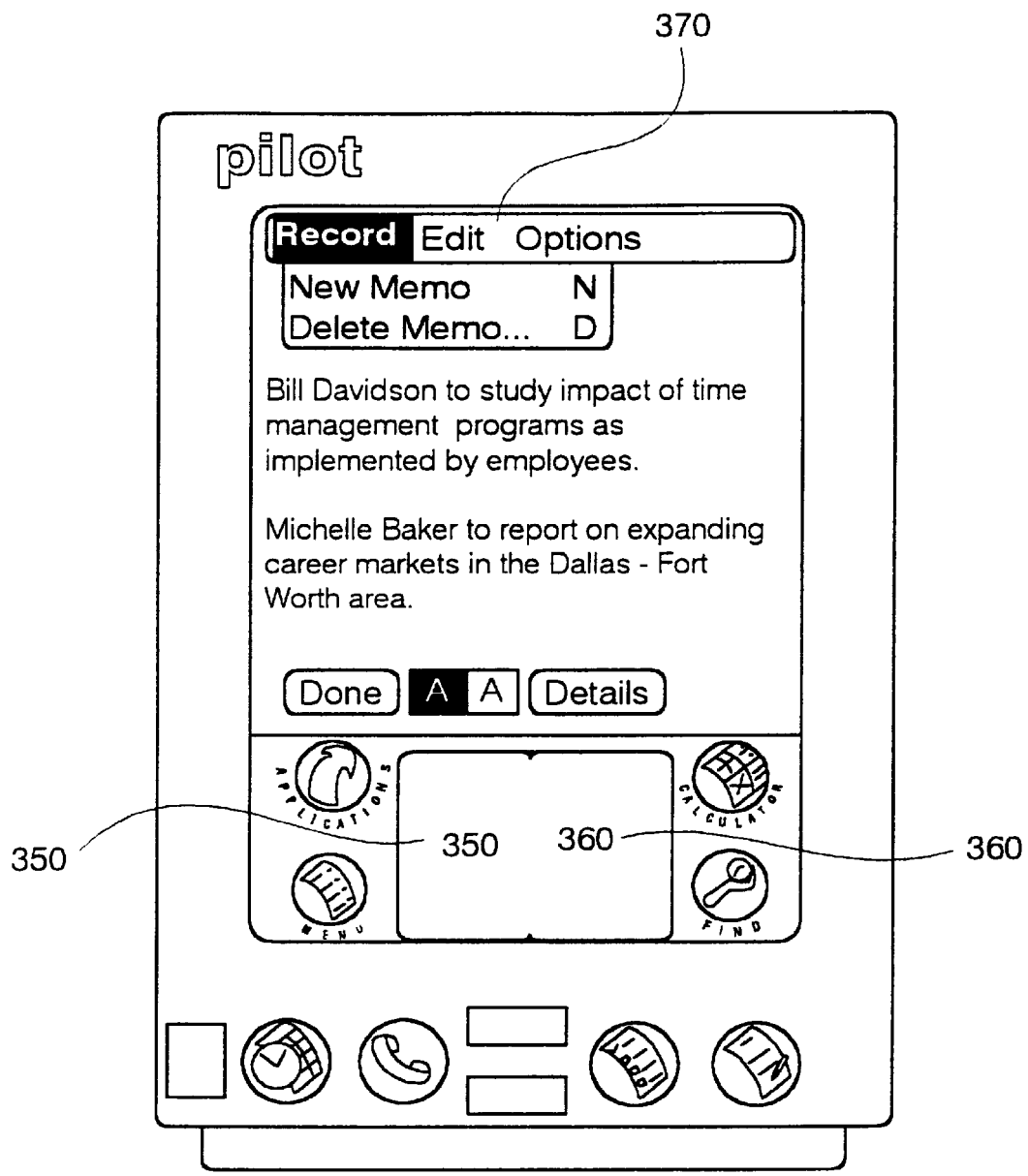
FIG. 3 illustrates a second embodiment of the pen-based computer system that uses separate alphabetic and numeric input boxes.

Methods and apparatus for implementing a multi-character set handwriting recognition system are disclosed. In the following description, for purposes of explanation, specific nomenclature is set forth to provide a thorough understanding of the present invention. However, it will be apparent to one skilled in the art that these specific details are not required to practice the present invention. In other instances, well-known circuits and devices are shown in block diagram form to avoid obscuring the present invention.

An Existing System

Pen based computer systems accept user handwriting for input. Handwriting recognition has proven to be a very difficult task. One method of simplifying the task of handwriting recognition is to split the handwriting into individual characters such that characters are written one by one. Then, each written character can be recognized individually. One embodiment of this recognition method is disclosed in the patent application titled "Multiple Pen Stroke Character Set and Handwriting Recognition System With Immediate Response" filed by Hawkins, et al. on Jul. 1, 1994, having U.S. Ser. No. 08/270,025.

FIG. 1 illustrates the different character strokes that are recognized as alphabetic character in the Hawkins patent. To enter the desired alphabetic letter, the user simply writes the appropriate character stroke. The dot indicates where the user begins the stroke.

FIG. 2 illustrates the different character strokes that are recognized as Arabic numbers in the Hawkins patent. To enter Arabic numbers, the Hawkins patent teaches a special "numeric mode." The numeric mode is required since several number characters are very similar to several alphabetic letter. Thus, the corresponding user input strokes are also very similar. Specifically, the "1" stroke is similar to the "I" stroke, the "2" stroke is similar to the "Z" stroke, the "5" stroke is similar to the "S", and so on. In the Hawkins patent, the user enters the numeric mode by tapping on an on-screen number icon or by entering a designated numeric lock stroke. (The numeric lock stroke in the Hawkins patent is a forward slash that is written from the bottom left to the top right.) Once the user is in the numeric mode, each successive stroke is interpreted as a numeric stroke as depicted in FIG. 2.

Numbers are often used in Personal Information Management (PIM) applications that are common in palmtop computer systems. Specifically, daily time organizers require numeric time of day input values and address books require numeric telephone numbers, street addresses, and ZIP codes. Therefore, it would be desirable to have a simple method of writing numbers. The numeric mode taught in the Hawkins patent is not ideal since it requires two extra strokes: an enter numeric mode stroke and an exit numeric mode stroke. Furthermore, numeric input in the Hawkins patent is implemented as a "mode" and user interface studies have shown that "modes" are often confusing to users.

The Numeric Input Box

To simplify the input of numbers, the present invention teaches using a separate numeric input box for entering Arabic numbers. The numeric input box is distinct from an alphabetic input box. By creating a distinct numeric input box, the ambiguities between a "1" stroke and an "I" stroke, a "2" stroke and a "Z" stroke, and a "5" stroke and an "S" stroke are not a problem since the recognition software will be attempting to recognize letters in the alphabetic input box and attempting to recognize numbers in the numeric input box.

FIG. 3 illustrates a second embodiment of the two input box system. In the embodiment of FIG. 3, the alphabetic input box 350 and the numeric input box 360 are permanently designated areas.

As illustrated in the embodiment of FIG. 3, a pull-down menu 370 is displayed. The pull-down menu 370 includes two menu options "New Memo" and "Delete Memo" that may be selected to perform a corresponding operation. Each menu item has an associated command letter that can be used to invoke the pull-down menu option when given in conjunction with a command stroke. Specifically, "New Memo" has the command letter "N" and "Delete Memo" has the command letter "D". To invoke a menu option with the associated command letter, an advanced user enters a command stroke followed by the command letter of the desired menu option. The command stroke signifies that the next stroke should be interpreted as a command. In a preferred embodiment, the command stroke is the forward slash stroke (a stroke from the bottom left to the top right) that was previous used as a numeric mode stroke.

Foreign Characters

The present invention can be used to implement multiple character sets used in various foreign languages. For example, an embodiment designed for Eastern European and Russian languages could use three different character input boxes: one for roman characters, one for numerals, and one for Cyrillic characters. By using different input boxes, the task of the hand writing recognition engine is simplified. Furthermore, the number of strokes required from the user to produce a unique character in each different input area is reduced.

Figure 4:
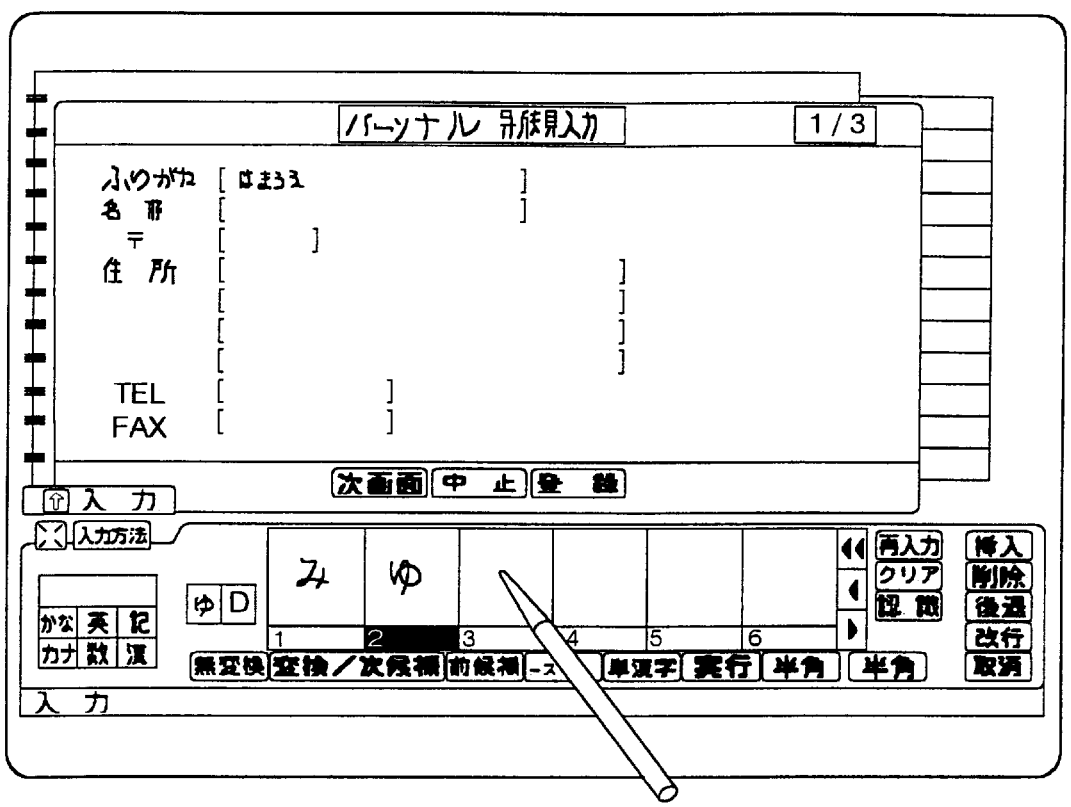
FIG. 4 illustrates a common prior art implementation of a Japanese writing recognition system.

Another particular interesting applications is Japanese since it uses a number of different character sets. The written Japanese language uses five different character sets: Kanji symbols, Hiragana characters, Katakana characters, Roman characters, and Arabic numerals. Prior art Japanese pen based computer systems usually use a complex front end processor to interpret handwritten characters. FIG. 4 illustrates a prior art Japanese pen based computer system. In the Japanese pen based computer system of FIG. 4, there are four successive input boxes. To write into the computer system of FIG. 4, a writer successively writes into the four input boxes. When the user begins to write into the next box, a previous box is interpreted by the character recognition system. Such Japanese writing recognition systems are often very slow due to the enormous number of possible characters that the recognition system must attempt to recognize.

Figure 5:
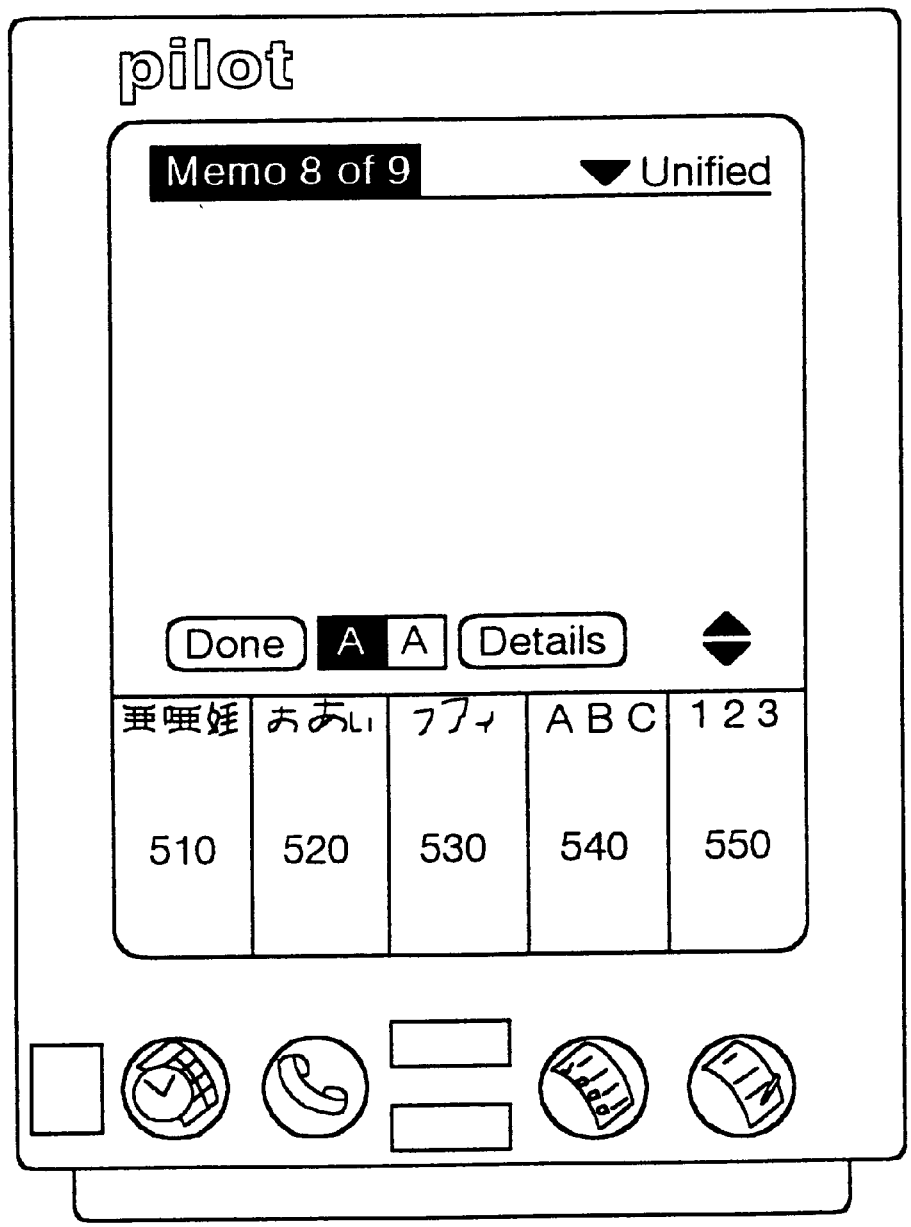
FIG. 5 illustrates an embodiment of a pen-based computer system that recognizes Japanese writing.

The present invention introduces a different method of entering Japanese text. In a first embodiment, each different type of character set could la be assigned its own input box. FIG. 5 illustrates such an embodiment. Referring to FIG. 5, there is a Kanji input box 510, a Hiragana character input box 520, a Katakana character input box 530, a Roman character input box 540, and an Arabic numeral input box 550.

As set forth in the previous section, an immediate character recognition system could be used in the Roman character input box 540 and the Arabic numeral input box 550. The separate Roman character input box 540 and the Arabic numeral input box 550 resolve ambiguity problems for entering roman letters and Arabic numbers that have similar shapes.

To interpret complex Hiragana and Katakana characters, traditional character recognition systems could be used to recognize characters in the Hiragana character input box 520 and Katakana character input box 530 respectively. However, an immediate character recognition system could also be created for both the Hiragana and Katakana character sets. In such an embodiment, an immediate Hiragana character recognition system would be invoked when the user writes into the Hiragana character input box 520 and an immediate Katakana character recognition system would be invoked when the user writes into the Katakana character input box 530.

Alternatively, the Hiragana character input box 520 and the Katakana character input box 530 can be used to enter Hiragana and Katakana characters using Romanized input systems such as the "Romaji" system. With a romanized input system, the various Kana characters are entered by writing the roman letters that make the phonetic sound of the Kana character. For example, to enter the Hiragana for the word "sushi", the user writes the letters "su" to obtain a Hiragana character for the first syllable and then the user writes the letters "shi" to obtain the Hiragana character for the second syllable. FIGS. 6a and 6b illustrate a romanized phonetic sounds and the associated Japanese Hiragana. Using the romanized input system, the same stroke recognition system could be used by the Roman character input box 540, the Hiragana character input box 520, and the Katakana character input box 530.

There are too many Kanji symbols to create a simple fast immediate Kanji symbol input system. Thus, the Kanji input box 510 would likely be implemented as a traditional Kanji recognition system. In a traditional Kanji recognition system, the Kanji input box 510 would be used to draw the desired Kanji symbol. After drawing the desired Kanji symbol, the user would request the computer system to interpret the Kanji symbol and translated it into code.

Alternatively, the Kanji input box 510 could be used to enter the romanized phonetic equivalent of the desired Kanji symbol. As the user enters the romanized phonetic equivalent, the computer could display a list of candidate Kanji symbols that the user may be trying to generated. When the desired Kanji symbol is displayed, the user selects the Kanji symbol from the list of candidates.

Figure 7:
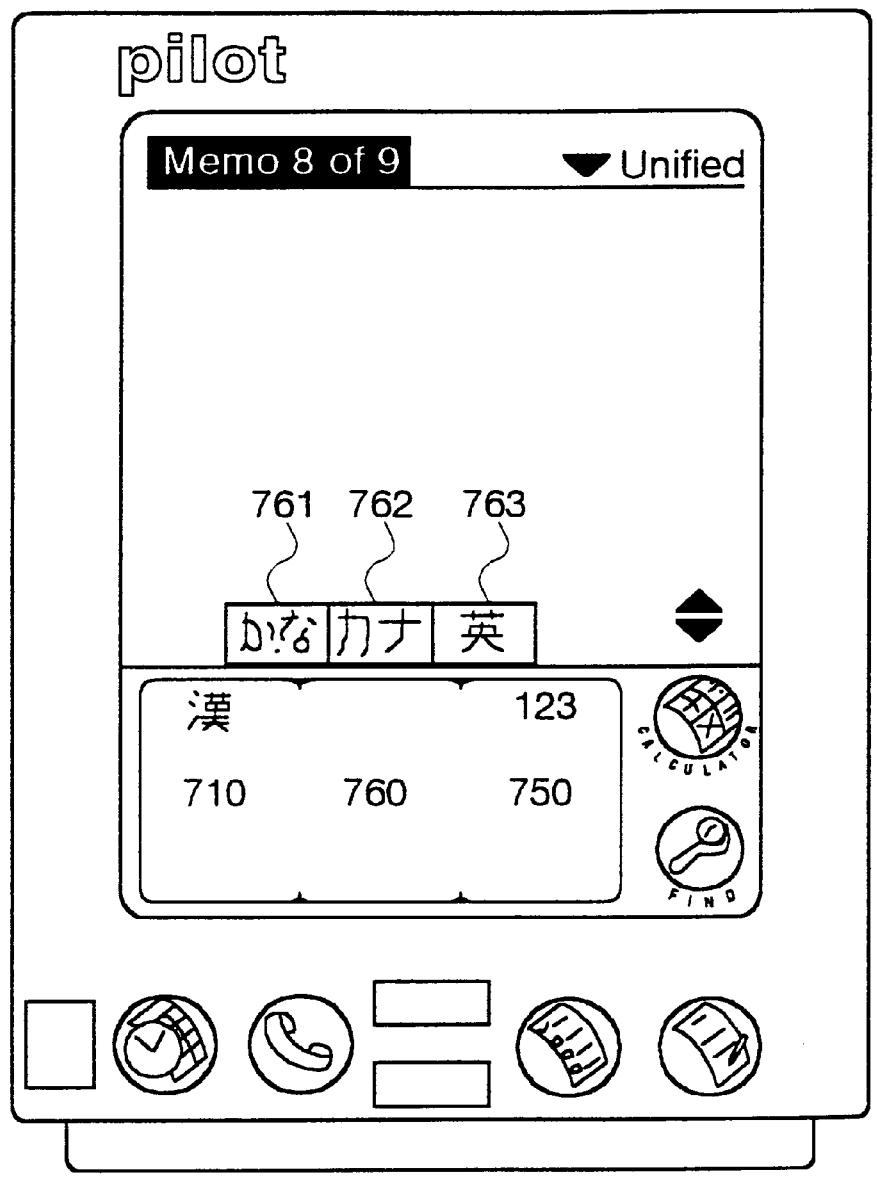
FIG. 7 illustrates a first embodiment of a pen-based computer system that recognizes Japanese writing using combined input box.
Figure 8:
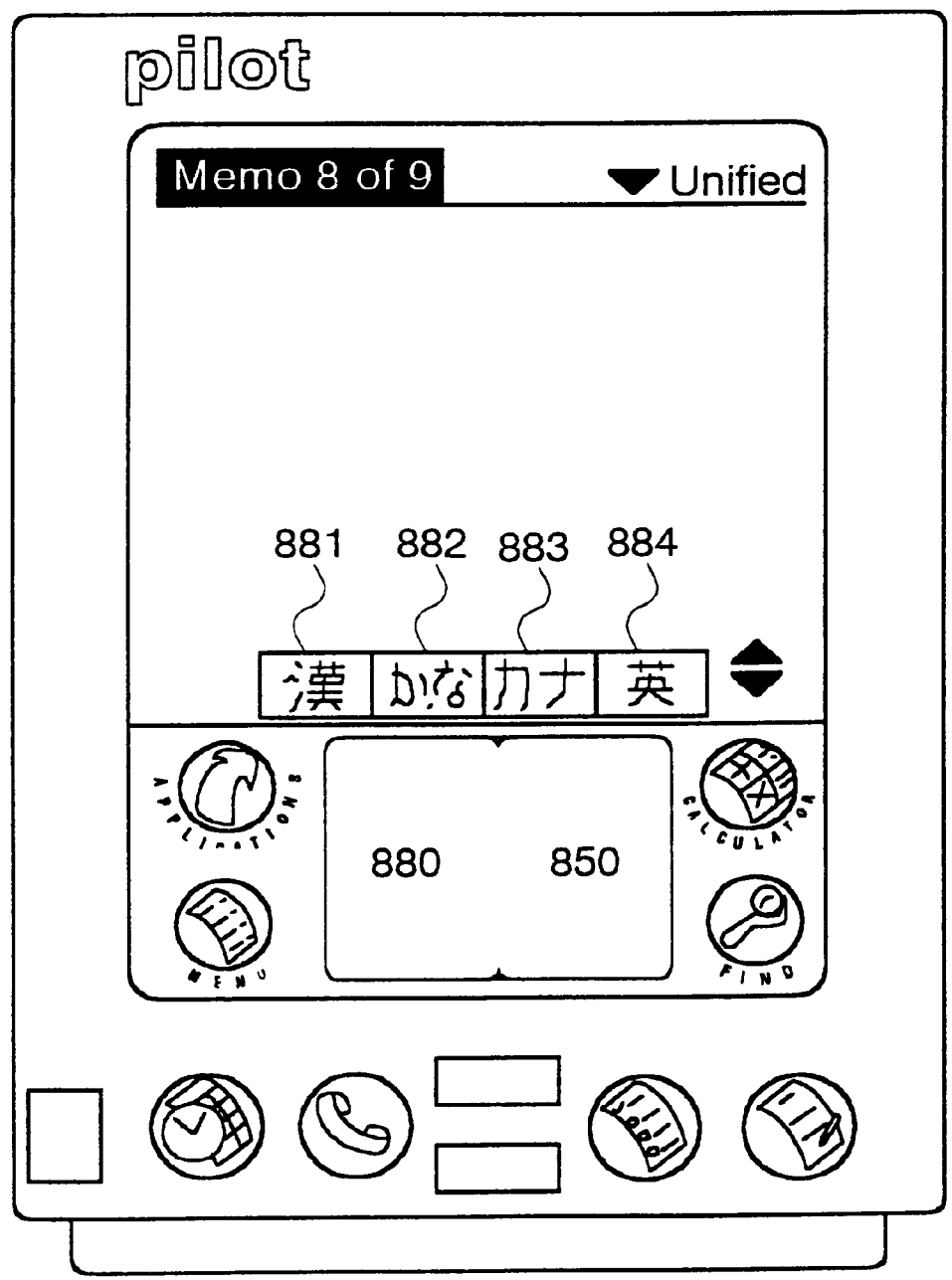
FIG. 8 illustrates a first embodiment of a pen-based computer system that recognizes Japanese writing using combined input box.

The techniques of using "mode strokes" or "mode boxes" to switch between character sets and using separate character input boxes to switch between different character sets can both be used in combination. FIG. 7 and FIG. 8 each illustrate an embodiment that combines the use of "mode boxes" and separate character boxes.

Referring to FIG. 7, an input system using three different character input boxes is illustrated. The leftmost character box is the Kanji input box 710. As previously described, the Kanji symbol set is very large and the characters are complex such that a dedicated Kanji recognition system is likely require. The rightmost character input box is the Arabic numeral input box 750. The Arabic numeral input box immediately recognizes Arabic numerals. The center box is a combined Hiragana, Katakana, and Roman character input box 760. The combined input box 760 attempts to recognize Hiragana, Katakana, or Roman characters depending on the current mode. The mode of the combined input box 760 is set using the Hiragana mode box 761, the Katakana mode box 761, and the Roman mode box 761. To switch between input modes, the user taps the stylus on the proper mode box. A single recognition system may be used for the combined input box 760 except that a different stroke and character data sets are used depending on the current mode.

FIG. 8 illustrates an embodiment with only two character input boxes. In the embodiment of FIG. 8, a combined input box 880 is used to recognize Kanji symbols, Hiragana characters, Katakana characters, or Roman characters. Similar to the embodiment of FIG. 7, the combined input box 880 attempts to recognize the user's writing depending on which of the mode boxes has been selected. In FIG. 8, there is a Kanji mode box 881, a Hiragana mode box 882, a Katakana mode box 883, and a Roman mode box 884. As illustrated with FIGS. 5, 7, and 8, many different permutations exist for the types of input boxes and the types of character recognition systems used.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A computer implemented method of inputting information into a palmtop computer system, said method comprising:

providing a first handwriting input area on a display for accepting strokes that are recognizable as alphabetic characters;

providing a second handwriting input area on the display for accepting strokes that are recognizable as numbers;

accepting a user input stroke on said first handwriting input area or said second handwriting input area;

if the user input is accepted on said first handwriting input area, then translating the user input stroke on said first handwriting input area as an alphabetic character, and displaying the alphabetic character on the display;

if the user input is accepted on said second handwriting input area, then translating the user input stroke on said second handwriting input area as a number, and displaying the number on the display.

2. The method of claim 1 wherein said steps of translating user input strokes comprise immediately recognizing a character after said user completes at least one stroke that defines a character.

3. The method of claim 1, wherein said steps of providing said first and said second handwriting input area comprise labeling a defined area on the display.

4. A computer implemented method of inputting information into a palmtop computer system, said method comprising:

providing a first handwriting input area on a display for accepting a first set of strokes for a first character set;

providing a second handwriting input area on the display for accepting a second set of strokes for a second character set;

accepting a user input stokes on said fist handwriting input area and said second handwriting input area;

translating user input strokes into said first handwriting input area as characters recognizable from said first character set;

translating user input strokes into said second handwriting input area as characters recognizable from said second character set;

displaying the characters from the fist character set and the characters from the second character set on the display.

5. The method of claim 4 wherein said first character set comprises alphabetic characters.

6. The method of claim 5 wherein said second character set comprises Arabic numerals.

7. The method of claim 4 wherein said steps of translating user input strokes comprise immediately recognizing a character after said user completes at least one stroke that defines a character.

8. A pen-based computer apparatus, said pen-based computer apparatus comprising:

a display screen; and a digitizer pad positioned relative to the display screen to receive input when a stylus makes contact with the display screen; and a first handwriting input area, said first handwriting input area provided on a first portion of the display screen and comprising a subarea of said digitizer pad; and a second handwriting input area, said second handwriting input area provided on a second portion of the display screen and comprising a subarea of said digitizer pad; and a handwriting interpreter, said handwriting interpreter immediately interpreting strokes written into said first handwriting input area as characters from a first character set and interpreting strokes written into said second handwriting input area as characters from a second character set; and wherein the display screen displays characters from the first character set and characters from the second set in response to strokes written into the first and second bandwriting areas, the characters from the first set and the second set being interpreted from the handwriting interpreter.

9. The apparatus of claim 8 wherein said first character set comprises alphabetic characters.

10. The apparatus of claim 9 wherein said second character set comprises Arabic numerals.

11. The apparatus of claim 8 wherein said handwriting interpreter comprises an immediate recognition system.

12. A computer implemented method of inputting information into a computer system, comprising:

providing a handwriting input area, the handwriting input area comprising of a left input box and a right input box, the left input box accepting characters from a first character set of a plurality of character sets, the right input box accepting characters from a second character set of the plurality of character sets;

providing a first set of mode boxes, each mode box in the first set indicating a character set of the plurality of character sets to be used in connection with the left input box;

providing a second set of mode boxes, each mode box in the second set indicating a character set of the plurality of character sets to be used in connection with the right input box;

accepting input indicating a first selected mode, the first selected mode indicating a mode box selected from the first set of mode boxes;

accepting input indicating a second selected mode, the second selected mode indicating a mode box selected from the second set of mode boxes;

interpreting a plurality of input strokes into the left input box as characters from the character set indicated by the first selected mode box; and interpreting a plurality of input strokes into the right input box as characters from the character set indicated by the second selected mode box.

13. The method of claim 12, wherein the right input box accepts only Arabic numerals.

14. The method of claim 12, wherein the left input box accepts alphabetic characters.

15. The method of claim 12, wherein interpreting comprises immediately recognizing the character after the user completes at least one stroke that defines a character.

* * * * *

UNITED STATES PATENT AND TRADEMARK OFFICE
CERTIFICATE OF CORRECTION

PATENT NO. : 6,188,789 B1
DATED : February 13, 2001
INVENTOR(S) : Ronald Marianetti, II et al.

It is certified that error appears in the above-identified patent and that said Letters Patent is hereby corrected as shown below:

Title page,
Item [54], Title, should read -- METHOD AND APPARATUS FOR IMMEDIATE RESPONSE HANDWRITING RECOGNITION SYSTEM THAT HANDLES MULTIPLE CHARACTER SETS --
Item [*] Notice, delete "This patent is subject to a terminal disclaimer"

Signed and Sealed this

Seventh Day of September, 2004

JON W. DUDAS
*Director of the United States Patent and Trademark Office*